United States Patent
Kottapalli et al.

(10) Patent No.: US 7,669,009 B2
(45) Date of Patent: Feb. 23, 2010

(54) METHOD AND APPARATUS FOR RUN-AHEAD VICTIM SELECTION TO REDUCE UNDESIRABLE REPLACEMENT BEHAVIOR IN INCLUSIVE CACHES

(75) Inventors: Sailesh Kottapalli, San Jose, CA (US); John H. Crawford, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 10/950,279

(22) Filed: Sep. 23, 2004

(65) Prior Publication Data
US 2006/0064547 A1 Mar. 23, 2006

(51) Int. Cl.
G06F 12/08 (2006.01)

(52) U.S. Cl. ............... 711/122; 711/160; 711/134; 711/135; 711/136; 711/141; 711/159

(58) Field of Classification Search ............ 711/133, 711/122, 135, 134, 136, 159, 160, 141
See application file for complete search history.

(56) References Cited

U.S. PATENT DOCUMENTS

| | | | | |
|---|---|---|---|---|
| 4,008,460 | A * | 2/1977 | Bryant et al. | 711/136 |
| 6,385,695 | B1 * | 5/2002 | Arimilli et al. | 711/122 |
| 6,535,958 | B1 * | 3/2003 | Fuoco et al. | 711/122 |
| 6,574,710 | B1 * | 6/2003 | Gaither et al. | 711/122 |
| 7,103,721 | B2 * | 9/2006 | Cargnoni et al. | 711/133 |
| 2002/0152359 | A1 * | 10/2002 | Chaudhry et al. | 711/141 |
| 2004/0215890 | A1 * | 10/2004 | Cargnoni et al. | 711/136 |
| 2006/0041720 | A1 * | 2/2006 | Hu et al. | 711/136 |

OTHER PUBLICATIONS

International Search Report, Feb. 15, 2006, 3 pages.
Written Opinion of the International Searching Authority, Feb. 15, 2006, 6 pages.
International Preliminary Report on Patentability (Chapter I of PCT), for International Application No. PCT/US2005/033700, International Filing date Sep. 13, 2005, mailed on Apr. 5, 2007, pp. 8 total.
Second Office Action from Counterpart German Patent Application No. 112005002268.4-53, dated Jun. 9, 2009 (7 pgs. Translation included).

* cited by examiner

Primary Examiner—Tuan V Thai
Assistant Examiner—Yong Choe
(74) Attorney, Agent, or Firm—Blakely, Sokoloff, Taylor & Zafman LLP

(57) ABSTRACT

A method and apparatus for selecting and updating a replacement candidate in a cache is disclosed. In one embodiment, a cache miss may initiate the eviction of a present replacement candidate in a last-level cache. The cache miss may also initiate the selection of a future replacement candidate. Upon the selection of the future replacement candidate, the corresponding cache line may be invalidated in lower-level caches but remain resident in the last-level cache. The future replacement candidate may be updated by subsequent hits to the replacement candidate in the last-level cache prior to a subsequent cache miss.

36 Claims, 6 Drawing Sheets

METHOD AND APPARATUS FOR RUN-AHEAD VICTIM SELECTION TO REDUCE UNDESIRABLE REPLACEMENT BEHAVIOR IN INCLUSIVE CACHES

FIELD

The present disclosure relates generally to microprocessors that use cache line replacement methods upon a miss to a cache, and more specifically to microprocessors that use cache line replacement methods in inclusive caches.

BACKGROUND

Microprocessors may utilize multi-level cache designs in order to reduce the latency of memory accesses. The cache levels closer to the processor cores (level one (L1) caches) may have a design emphasis on low latency, while the cache levels farthest from the processor cores (last-level caches (LLC)) may have a design emphasis on larger capacity. Intermediate cache levels, if present, may be designed for performance with a tradeoff being made between low latency and large capacity.

When a memory access (e.g. read or write) is made to a cache, a determination is made whether the requested memory location is present in the cache (a cache "hit") or not (a cache "miss"). If a miss occurs, then room in the cache must be made for the requested line to be loaded from an upper-level cache or from system memory. Caches generally have a replacement method for determining which existing cache line should be evicted to make room for this new cache line. This process may often be referred to as "victimization". Replacement methods may include well-known methods such as the least-recently-used (LRU) method, the random selection method, and the first-in-first-out (FIFO) method. Each of these and other methods may have advantages and drawbacks.

To preserve cache coherency in a multi-processor core system, snooping for requested cache lines is often performed. In a multi-level cache system, this would in general mean that snoop messages would need to be propagated downward, starting at the last-level caches and continuing all the way down to the L1 caches. Partially in order to reduce the latency produced by these snoop messages, many caches are designed to be inclusive. An inclusive cache maintains the property that any cache line present in a lower-level cache is also present in that inclusive cache. Therefore, snooping may in many circumstances need only be performed to the last-level caches: if a particular cache line is not present in the last-level cache, then by the inclusive property it will not be present in any lower-level caches either. However, the inclusive property may produce performance-reducing artifacts of its own.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for an improved cache line replacement method for use in the victimization process in multi-level caches. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of caches present in multi-core implementations of Pentium® compatible processor such as those produced by Intel® Corporation. However, the invention may be practiced in the caches present in other kinds of processors, such as an Itanium® Processor Family compatible processor or an X-Scale® family compatible processor.

Figure 1:
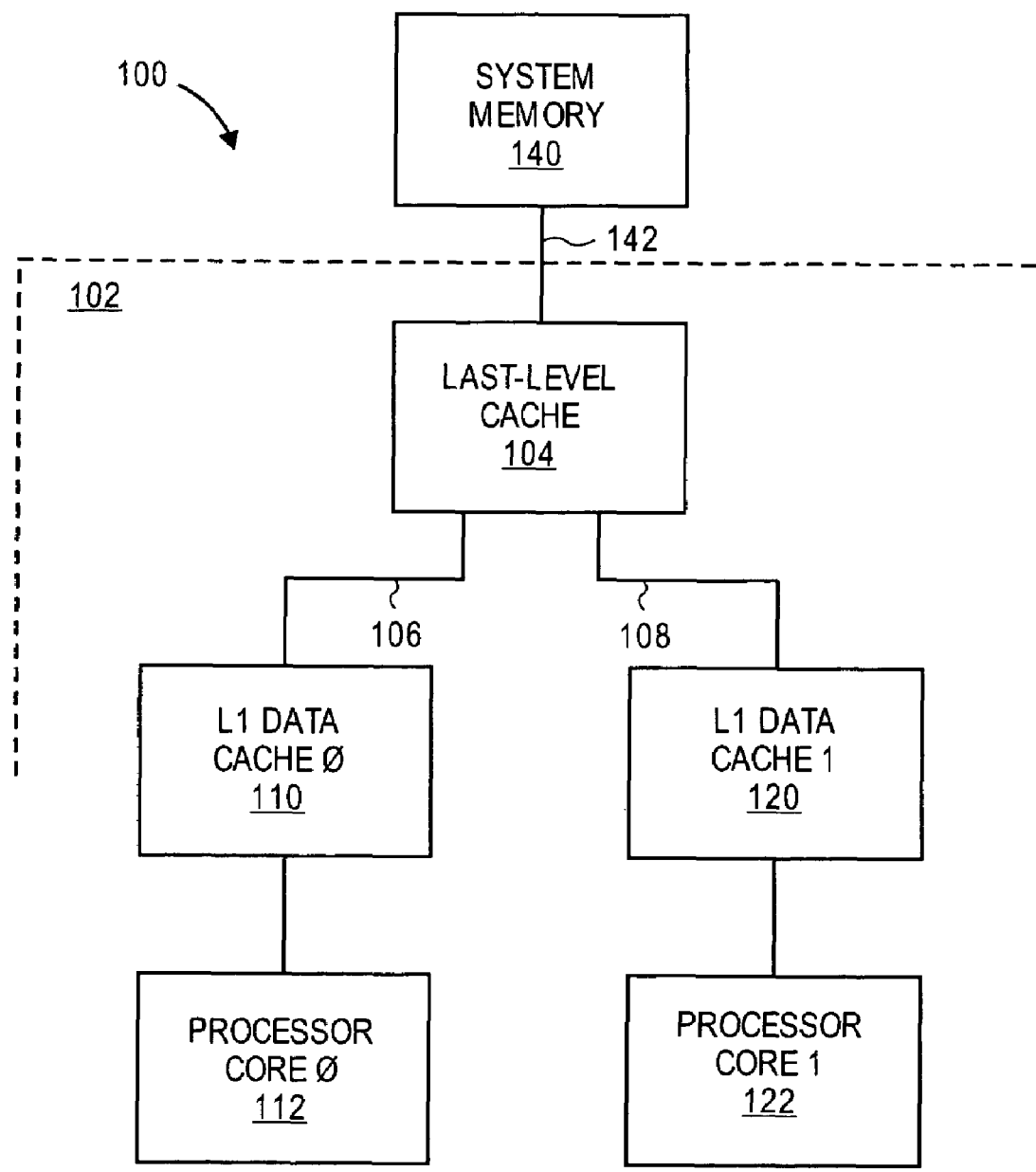
FIG. 1 is a schematic diagram of a multi-core processor including a last-level cache, according to one embodiment.

Referring now to FIG. 1, a schematic diagram of a multi-core processor 102 including a last-level cache 104 is shown, according to one embodiment. Shown in this embodiment is the case which uses two processor cores, processor core 0 112 and processor core 1 122. In other embodiments, a single processor core or more than two processor cores may be used. By its title, last-level cache 104 generally indicates that this is the cache farthest from the processor cores 112, 122 and closest to system memory 140. However, in some embodiments there may be higher level caches between the multi-core processor 102 and system memory 140.

Last-level cache 104 may be configured as a unitary cache (both data and instructions) or as a data cache. The lowest-level caches, level one (L1) data cache 0 110 and L1 data cache 1 120, are shown directly below last-level cache 104 in the cache hierarchy of multi-core processor. In other embodiments, there may be additional caches, such as a level two (L2) cache, configured between the L1 data caches 110, 120 and the last-level cache 104. Last-level cache 104 generally includes an interface circuit which permits data transmission between last-level cache 104 and system memory 140 over an interface 142. In various embodiments interface 142 may be a multi-drop bus or a point-to-point interface.

In certain embodiments, last-level cache 104 may be inclusive. An inclusive cache is one in which any cache line contained in a lower-level cache is also contained in the inclusive cache. The inclusive property permits simplified snooping for ensuring cache coherency, as one only needs to snoop to the inclusive cache and not to any lower-level caches to determine whether a particular cache line is present.

Figure 2:
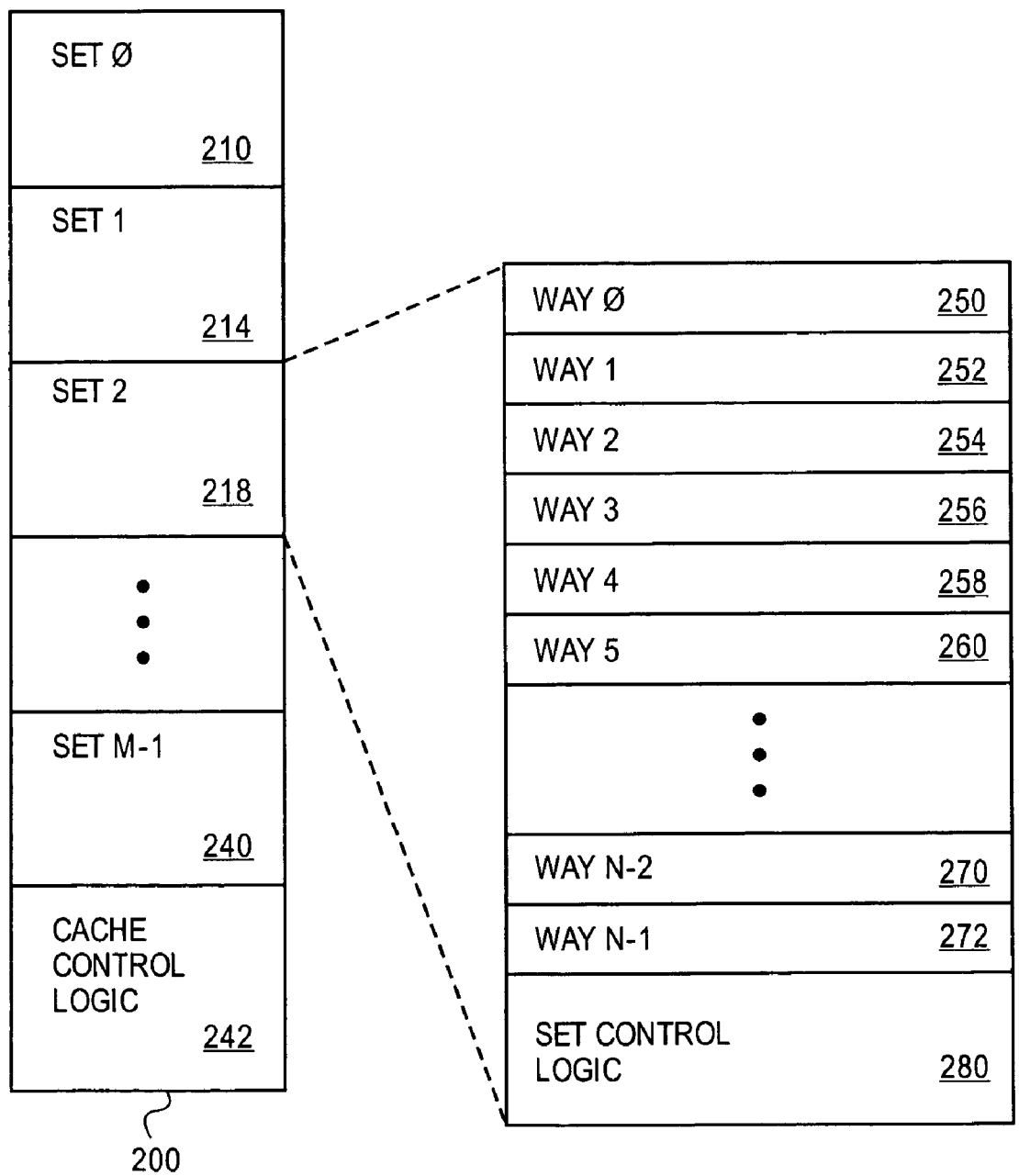
FIG. 2 is a schematic diagram of a cache, according to one embodiment.

Referring now to FIG. 2, a schematic diagram of a cache 200 is shown, according to one embodiment. Cache 200 may in some embodiments be the last-level cache 104 of FIG. 1. In other embodiments, cache 200 may be an intermediate-level cache. Cache 200 is shown as an N-way set associative cache. In an N-way set associative cache, each of the M sets has N places to hold a cache line, called a "way". Any particular cache line in system memory may only be loaded into a particular one of the M sets, but that particular cache line may be loaded into any of the N ways of that particular set. As a boundary case, a fully-associative cache may be considered an N-way set associative cache with only one set.

FIG. 2 shows cache 200 with M sets, labeled set 0 210 through set M-1 240. The cache 200 may include a cache control logic 242 which may include circuitry to interface with external interfaces, respond to snoop requests, forward requests to system memory on a cache line miss, and forward cache lines to lower-level caches on a cache line hit. One of the sets, set 2 218, has further details shown. The other sets shown may have similar details within. Way 0 250 through way N-1 272 are shown, along with a set control logic 280. Set control logic may include circuitry to identify a replacement method when new cache lines need to be added to set 2, generally as a result as a "miss" to the cache. This replacement method may identify which way contains a cache line to be overwritten by the new cache line. This identified cache line may be called a "replacement candidate". The replacement method may in varying embodiments be made by identifying a least-recently-used cache line (LRU), by identifying a replacement candidate randomly, or by identifying a replacement candidate by order of loading in the set (e.g. first-in-first-out (FIFO)). All of these replacement methods may initially seek invalid cache lines and only proceed to their specific method when no invalid cache lines are found. In other embodiments, other replacement methods may be used.

One artifact of the cache being inclusive is that when a replacement candidate is determined, and that cache line is allowed to be evicted ("victimized"), then all equivalent cache lines present in lower-order caches should also be invalidated. This preserves the property of inclusiveness, but at a cost. A particular cache line that is repeatedly being used in a lower-level cache may, for this very reason, not be frequently loaded from the last-level cache. When using a replacement method such as LRU, this may cause this very cache line to be selected as a replacement candidate. In current practice, the replacement candidate would be evicted and that cache line invalidated in the lower-level caches. This particular cache line, being actively used in the lower-level cache, would then endure a latency penalty by needing to be brought back from system memory.

Therefore, in one embodiment, the set control logic may make several actions on each cache miss to the set. The set control logic may evict the cache line of the present replacement candidate, which was identified at an earlier time. The set control logic may also identify a future replacement candidate, using whatever replacement method is used. In one embodiment, the set control logic may cause the issuance of invalidation messages for the cache line contained in the future replacement candidate to the lower-level caches. In summary, in one embodiment a particular cache miss to a set may cause three actions: the eviction of the present replacement candidate from the last-level cache; the identification of the future replacement candidate; and the invalidation of the cache line of the future replacement candidate in the lower-level caches.

In the case of a frequently-used cache line in the lower-level cache being invalidated as the cache line of the future replacement candidate, it is possible that that cache line will be requested by the corresponding processor core soon after the invalidation occurs. If this occurs prior to a second miss to the same cache set, then the future replacement candidate will still be available in the last-level cache. Therefore a cache hit will occur for this cache line, corresponding to the future replacement candidate. In this case, the set control logic 280 may identify another future replacement candidate, invalidate the cache line of the new future replacement candidate in the lower-level caches, and send the cache line of the first future replacement candidate down to the lower-level cache. At the time of a second miss to that set of the last-level cache, the set control logic may then evict the cache line of the second replacement candidate. The process of replacing an i'th future replacement candidate with an (i+1)'th future replacement candidate may be performed several times as needed until the time of the second miss to that set of the last-level cache.

There may be several slightly different methods of timing the eviction of the replacement candidate to the corresponding cache miss. In one embodiment, the eviction may be made at the time of (or shortly thereafter) the determination being made that a miss occurs. In other embodiments, the eviction may be postponed until the time that the fill buffer of the cache receives the accessed cache line from a higher-level cache or from system memory.

Figure 3:
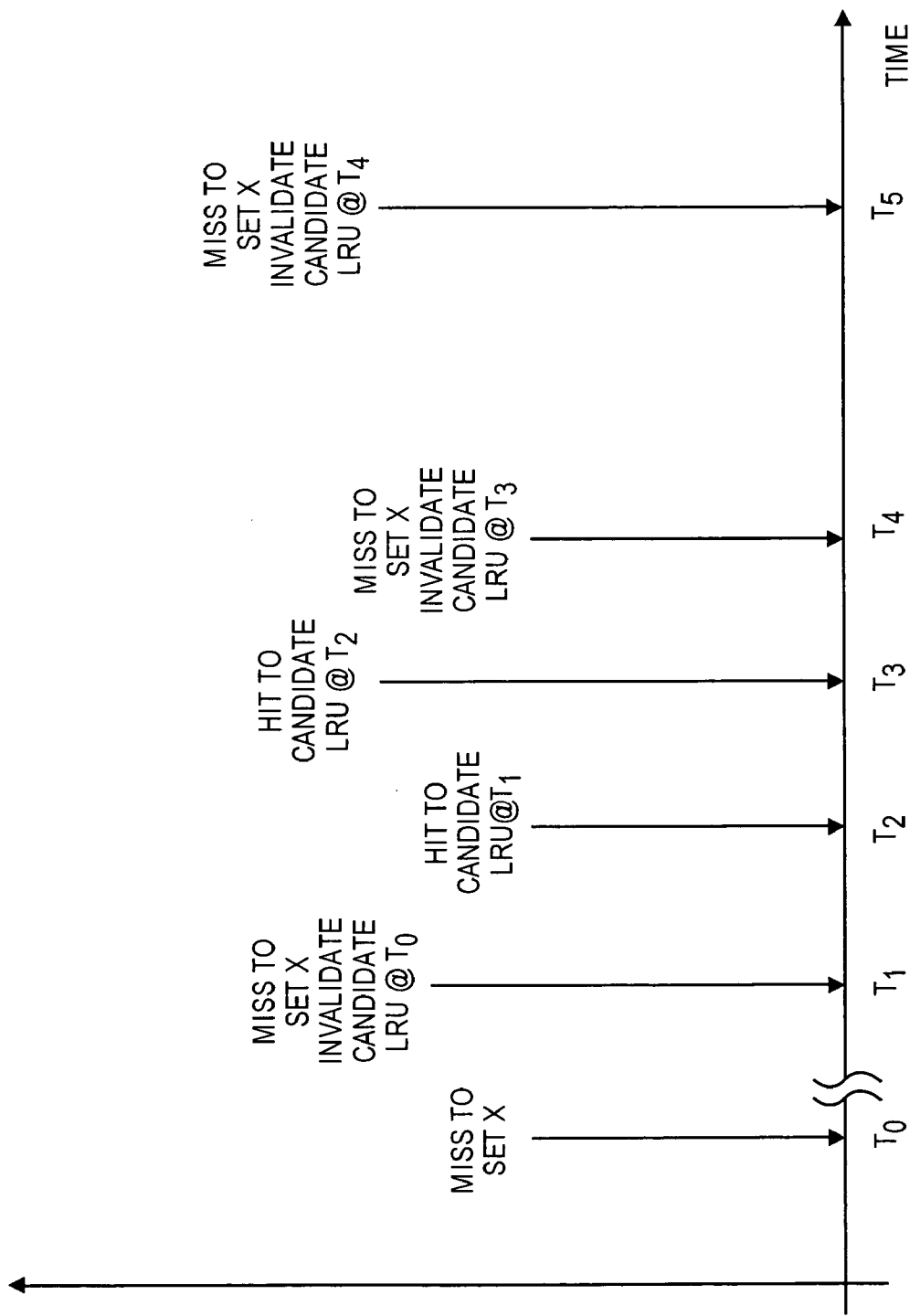
FIG. 3 is a timing diagram of events in a cache system, according to one embodiment.

Referring now to FIG. 3, a timing diagram of events in a cache system is shown, according to one embodiment. The FIG. 3 embodiment illustrates an LRU replacement method being used, but in other embodiments any of the other replacement methods could be used. At time T0, a miss occurs to set X of the last-level cache. Therefore the way which has the LRU at time T0 is selected as a future replacement candidate, and the cache line of that way is invalidated in the lower-level caches.

At time T1, another miss to set X occurs, which causes the future replacement candidate, the way which had the LRU at time T0, to be evicted from the last level cache. At the same time, a new future replacement candidate is selected (the way which has the LRU at time T1), and the cache line corresponding to the new future replacement candidate is invalidated in the lower-level caches. However, the cache line corresponding to the new future replacement candidate remains resident in the last-level cache.

At time T2, a hit occurs to the future replacement candidate (still resident in the last-level cache). Yet another new future replacement candidate is selected (the way which has the LRU at time T2), the cache line corresponding to the new future replacement candidate is invalidated in the lower-level caches, and the cache line requested in the hit is sent to the lower-level caches. The older future replacement candidate, which had the LRU at time T1, is then tagged in the replacement method tracking as the most-recently used (MRU) at time T2. Again, the cache line corresponding to the new future replacement candidate remains resident in the last-level cache.

At time T3, a hit occurs to the future replacement candidate (still resident in the last-level cache). Yet another new future replacement candidate is selected (the way which has the LRU at time T3), the cache line corresponding to the new future replacement candidate is invalidated in the lower-level caches, and the cache line requested in the hit is sent to the lower-level caches. The older future replacement candidate, which had the LRU at time T2, is then tagged in the replacement method tracking as the most-recently used (MRU) at time T3. Again, the cache line corresponding to the new future replacement candidate remains resident in the last-level cache.

At time T4, another miss to set X occurs. This causes the pending future replacement candidate, the way which had the LRU at time T3, to be evicted from the last level cache. At the same time, a new future replacement candidate is selected (the way which has the LRU at time T4), and the cache line corresponding to the new future replacement candidate is invalidated in the lower-level caches.

In this example, no hits to the future replacement candidate occur before the next miss to set X occurs at time T5. This causes the pending future replacement candidate, the way which has the LRU at time T4, to be evicted from the last level cache. At the same time, a new future replacement candidate is selected (the way which has the LRU at time T5), and the cache line corresponding to the new future replacement candidate is invalidated in the lower-level caches.

Even though the FIG. 3 example only showed two hits to a replacement candidate between the last-level cache misses at times T1 and T4, there is no real limit to the number of hits that may be serviced by this embodiment.

Figure 4:
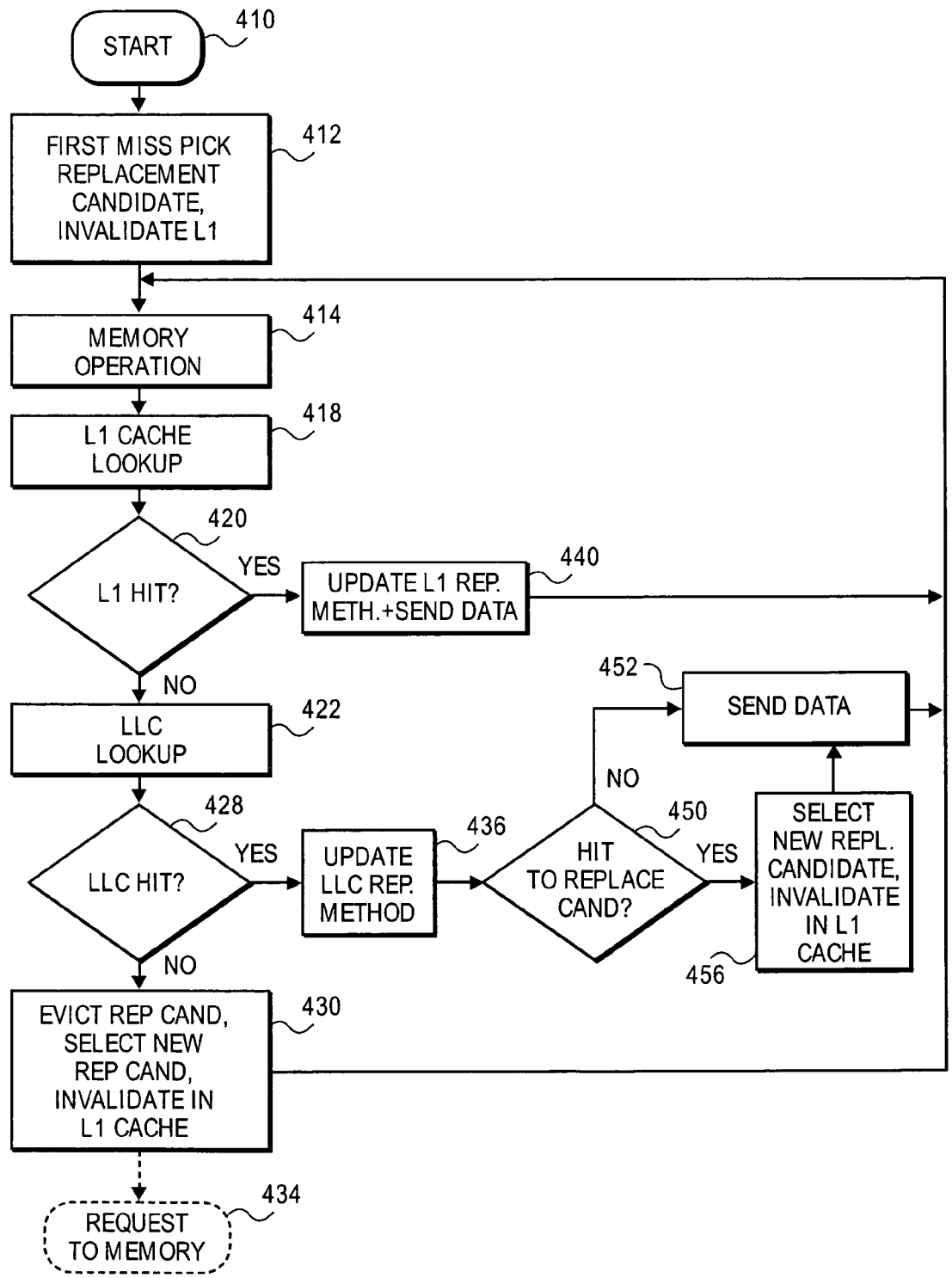
FIG. 4 is a flowchart diagram of a method for selecting replacement candidates, according to one embodiment of the present disclosure.

Referring now to FIG. 4, a flowchart diagram of a method for selecting replacement candidates is shown, according to one embodiment of the present disclosure. The FIG. 4 embodiment presupposes the existence of an L1 cache and a last-level cache. In other embodiments, additional levels of cache below the last-level cache may be present. The process begins at block 410. Upon servicing a first miss to the last-level cache, in block 412 a replacement candidate is selected by the replacement method, and the corresponding cache line in the L1 cache is invalidated. If the replacement method is LRU, then the replacement candidate will be the current value of the LRU of the last-level cache.

A memory operation is acted upon in block 414. An L1 cache lookup may be made at block 418, and in decision block 420 a determination is made whether a hit occurs to the L1 cache. If so, then the process exits via the YES path, and in block 440 the replacement method status for the L1 cache is updated and the data for the requested cache line is returned to the processor core. If the replacement method is LRU, then the replacement method status update will be to update the current value of the LRU of the L1 cache. The process may then return to block 414.

If, in decision block 420, it is determined that a hit does not occur, then the process exits via the NO path, and in block 422 a last-level cache lookup is made. Then in decision block 428 a determination is made whether a hit occurs in the last-level cache. If so, then the process exits via the YES path, and in block 436 the replacement method status for the last-level cache is updated. If the replacement method is LRU, then the replacement method status update will be to update the current value of the LRU of the last-level cache. Then in decision block 450 it may be determined whether the hit was to the replacement candidate. If not, then the process exits via the NO path, and in block 452 the data for the requested cache line is returned to the L1 cache and the processor core. If, however, the hit was to the replacement candidate, then the process exits via the YES path from decision block 450. In block 456 a new replacement candidate is selected, and the corresponding cache line is invalidated in the L1 cache. If the replacement method is LRU, then the replacement candidate will be the current value of the next-least-recently-used cache line of the last-level cache. Then in block 452 the data for the requested cache line is returned to the L1 cache and the processor core. If the replacement method is LRU, then the replacement method status update will be to promote the current value of the next-least-recently-used cache line of the last-level cache to that of LRU. Then the process may repeat again starting at block 414.

If, however, in decision block 428 a determination is made that a hit does not occur in the last-level cache, then the process exits decision block 428 via the NO path. Then in block 434 several actions may be taken. The cache line of the replacement candidate may be evicted in favor of the requested cache line which will appear in a last-level cache fill buffer. A new replacement candidate may be selected, and the corresponding cache line invalidated in the L1 cache. If the replacement method is LRU, then the replacement candidate will be the current value of the next-least-recently-used cache line of the last-level cache. The process may repeat again starting at block 414.

In the process shown in FIG. 4, the servicing of the last-level cache miss, discussed in block 430, may initiate a request for the cache line from system memory. This is shown in dotted-line block 434. The eviction of the cache line of the replacement may occur (in the FIG. 4 embodiment) at (or shortly thereafter) the time of the initiation of that request. In other embodiments, the eviction of the cache line of the replacement candidate may be delayed until the cache line (corresponding to the miss) arrives in the fill buffer of the last-level cache from memory.

Figure 5A:
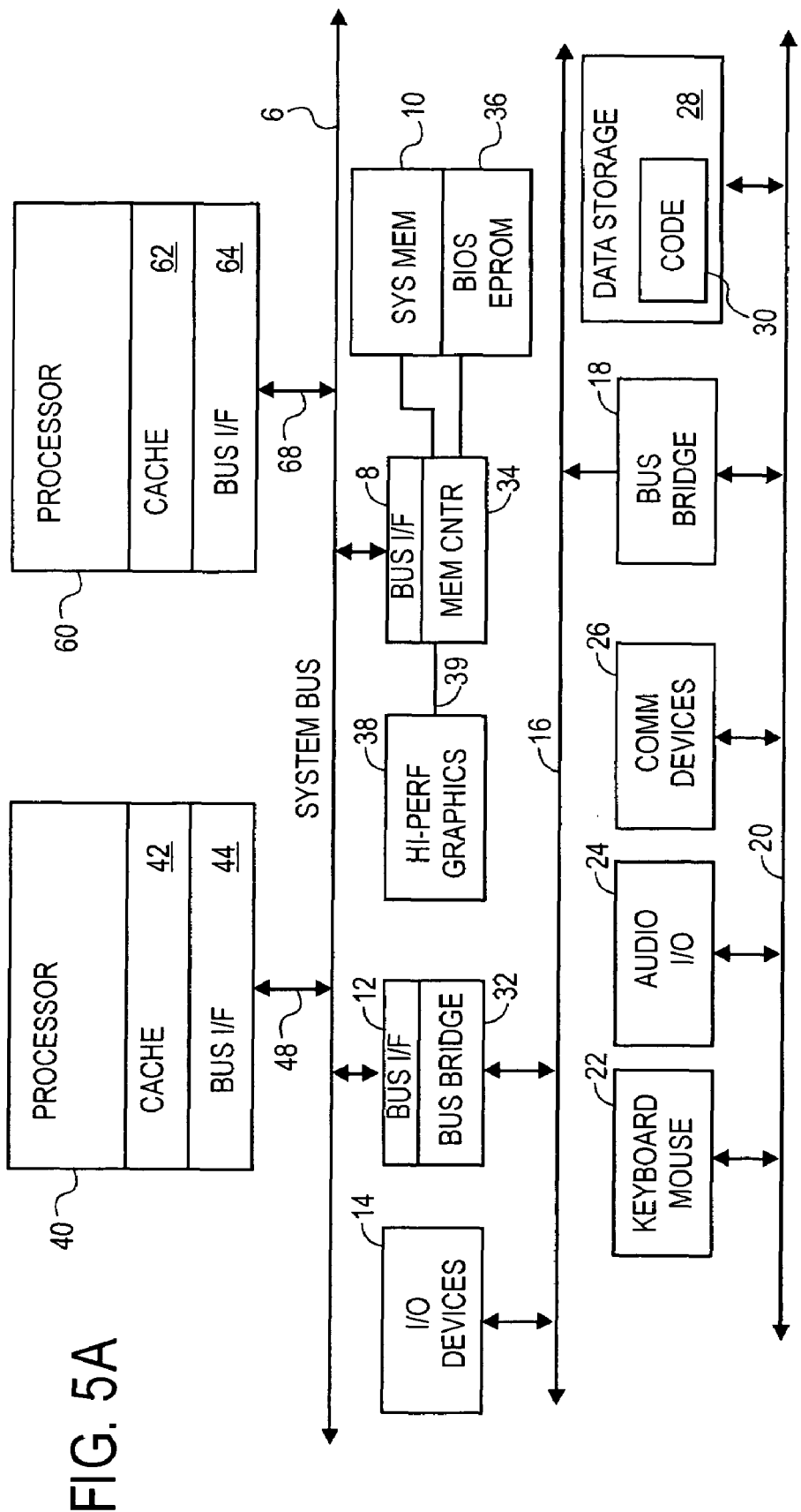
FIGS. 5A and 5B are schematic diagrams of systems including processors with caches, according to two embodiments of the present disclosure.
Figure 5B:
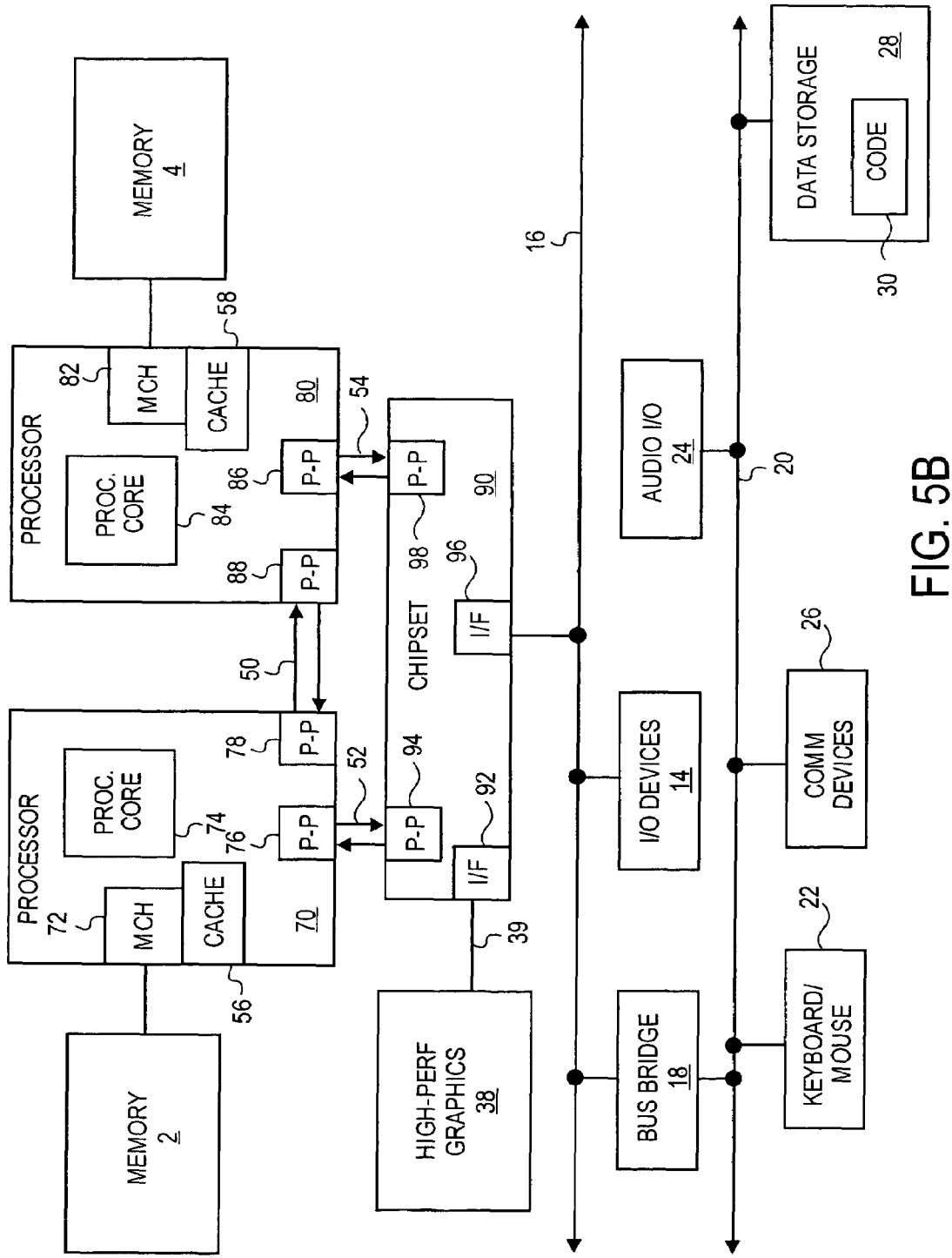

Referring now to FIGS. 5A and 5B, schematic diagrams of systems including processors with throttles and multiple cores are shown, according to two embodiments of the present disclosure. The FIG. 5A system generally shows a system where processors, memory, and input/output devices are interconnected by a system bus, whereas the FIG. 5B system generally shows a system where processors, memory, and input/output devices are interconnected by a number of point-to-point interfaces.

The FIG. 5A system may include several processors, of which only two, processors 40, 60 are shown for clarity. Processors 40, 60 may include last-level caches 42, 62. The FIG. 5A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 5A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

The FIG. 5B system may also include several processors, of which only two, processors 70, 80 are shown for clarity. Processors 70, 80 may each include a local memory controller hub (MCH) 72, 82 to connect with memory 2, 4. Processors 70, 80 may also include last-level caches 56, 58. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 5A system, bus bridge 32 may permit data exchanges between system bus 6 and bus 16, which may in some embodiments be a industry standard architecture (ISA) bus or a peripheral component interconnect (PCI) bus. In the FIG. 5B system, chipset 90 may exchange data with a bus 16 via a bus interface 96. In either system, there may be various input/output (I/O) devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a multi-level cache memory including a lower-level cache and at least one higher-level cache, said lower-level cache located closer to a processor and having lower access latency than said higher-level cache;
   a set control logic to identify a first replacement candidate within said higher-level cache responsive to a first cache miss to said higher-level cache, to invalidate a cache line corresponding to the first replacement candidate in the lower-level cache, and to evict said first replacement candidate only if there is a second cache miss to said first replacement candidate within said higher-level cache prior to an intervening cache hit to said first replacement candidate within said higher-level cache; and
   a cache control logic to forward requests to system memory on a cache miss.

2. The apparatus of claim 1, wherein said set control logic to identify a second replacement candidate within said higher-level cache when a cache hit to said first replacement candidate occurs prior to said second cache miss to said multi-level cache.

3. The apparatus of claim 2, wherein said set control logic to send said cache line of said first replacement candidate to said lower-level cache.

4. The apparatus of claim 1, wherein said set control logic to identify said first replacement candidate by a replacement method.

5. The apparatus of claim 4, wherein said replacement method is a random method.

6. The apparatus of claim 4, wherein said replacement method is a first-in-first-out method.

7. The apparatus of claim 4, wherein said replacement method is a least-recently-used method.

8. The apparatus of claim 7, wherein said set control logic to identify a second replacement candidate within said higher-level cache and to establish said first replacement candidate as most-recently-used when a cache hit to said first replacement candidate in said lower-level cache occurs prior to said second cache miss to said higher-level cache.

9. The apparatus of claim 8, wherein said set control logic to identify said second replacement candidate within said higher-level cache after said cache hit to said first replacement candidate in said higher-level cache occurs.

10. A method, comprising:
    identifying a first replacement candidate within a higher-level cache of a multi-level cache memory after a first cache miss to said higher-level cache, said multi-level cache memory including said higher-level cache and at least one lower-level cache, said lower-level cache located closer to a processor and having lower access latency than said higher-level cache;
    invalidating a cache line corresponding to said first replacement candidate in said lower-level cache; and
    evicting said first replacement candidate from said higher-level cache only if there is a second cache miss to said first replacement candidate in said higher-level cache prior to an intervening cache hit to said first replacement candidate in said higher-level cache.

11. The method of claim 10, further comprising identifying a second replacement candidate within said higher-level cache when a cache hit to said first replacement candidate within said higher-level cache occurs prior to said second cache miss to said multi-level cache.

12. The method of claim 11, further comprising sending said cache line in response to said cache hit.

13. The method of claim 10, wherein said identifying a first replacement candidate includes implementing a replacement method.

14. The method of claim 13, wherein said replacement method determines said first replacement candidate by random selection.

15. The method of claim 13, wherein said replacement method determines said first replacement candidate by implementing first-in-first-out.

16. The method of claim 13, wherein said replacement method determines said first replacement candidate by determining a least-recently-used cache line.

17. The method of claim 13, further comprising identifying a second replacement candidate within said higher-level cache and establishing said first replacement candidate as most-recently-used when a cache hit to said first replacement candidate in said higher-level cache occurs prior to said second cache miss.

18. The method of claim 17, wherein said identifying a second replacement within said higher-level cache candidate occurs before said second cache miss.

19. system, comprising:
    a multi-level cache memory having a lower-level cache and at least one higher-level cache, said lower-level cache located closer to a processor and having lower access latency than said higher-level cache;
    a set control logic to identify a first replacement candidate within said higher-level cache responsive to a first cache miss to said higher-level cache, to invalidate a cache line corresponding to the first replacement candidate in the lower-level cache, and to evict said first replacement candidate only if there is a second cache miss to said first replacement candidate within said higher-level cache prior to an intervening cache hit to said first replacement candidate within said higher-level cache; and
    a cache control logic to forward requests to system memory on a cache miss and
    an audio input/output coupled to said multi-level cache memory.

20. The system of claim 19, wherein said set control logic to identify a second replacement candidate within said higher-level cache when a cache hit to said first replacement candidate in said higher-level cache occurs prior to said second cache miss to said multi-level cache.

21. The system of claim 20, wherein said set control logic to send said cache line of said first replacement candidate to said lower-level cache.

22. The system of claim 19, wherein said set control logic to identify said first replacement candidate by a replacement method.

23. The system of claim 22, wherein said replacement method is a random method.

24. The system of claim 22, wherein said replacement method is a first-in-first-out method.

25. The system of claim 22, wherein said replacement method is a least-recently-used method.

26. The system of claim 25, wherein said set control logic to identify a second replacement candidate within said higher-level cache and to establish said first replacement candidate as most-recently-used when a cache hit to said first replacement candidate in said lower-level cache occurs prior to said second cache miss to said higher-level cache.

27. The system of claim 26, wherein said control logic to identify said second replacement candidate after said cache hit to said first replacement candidate in said higher-level cache occurs.

28. An apparatus, comprising:
a multi-level cache memory including a lower-level cache and at least one higher-level cache, said lower-level cache located closer to a processor and having a lower access latency than said higher-level caches;
means for identifying a first replacement candidate within said higher-level cache after a first cache miss to a said higher-level cache;
means for invalidating a cache line corresponding to said first replacement candidate in said lower-level cache subsequent to said first cache miss; and
means for evicting said first replacement candidate from said higher-level cache only if there is a second cache miss to said first replacement candidate in said higher-level cache prior to an intervening cache hit to said first replacement candidate in said higher-level cache.

29. The apparatus of claim 28, further comprising means for identifying a second replacement candidate within said higher-level cache when a cache hit to said first replacement candidate in said higher-level cache occurs prior to said second cache miss to said higher-level cache.

30. The apparatus of claim 29, further comprising means for sending said cache line to said lower-level cache in response to said cache hit.

31. The apparatus of claim 28, wherein said means for identifying a first replacement candidate includes means for implementing a replacement method.

32. The apparatus of claim 31, wherein said replacement method includes means for determining said first replacement candidate by random selection.

33. The apparatus of claim 31, wherein said replacement method includes means for determining said first replacement candidate by implementing first-in-first-out.

34. The apparatus of claim 31, wherein said replacement method includes means for determining said first replacement candidate by determining a least-recently-used cache line.

35. The apparatus of claim 34, further comprising means for identifying a second replacement candidate within said higher-level cache and means for establishing said first replacement candidate as most-recently-used when a cache hit to said first replacement candidate in said higher-level cache occurs prior to said second cache miss.

36. The method of claim 35, wherein said means for identifying a second replacement candidate performs its identification after said cache hit to said first replacement candidate in said higher-level cache.

* * * * *

UNITED STATES PATENT AND TRADEMARK OFFICE
CERTIFICATE OF CORRECTION

| | | |
|---|---|---|
| PATENT NO. | : 7,669,009 B2 | |
| APPLICATION NO. | : 10/950279 | |
| DATED | : February 23, 2010 | |
| INVENTOR(S) | : Kottapalli et al. | |

It is certified that error appears in the above-identified patent and that said Letters Patent is hereby corrected as shown below:

In column 8, at line 50 delete, "system" and insert --A system--.

Signed and Sealed this
Eighteenth Day of January, 2011

David J. Kappos
*Director of the United States Patent and Trademark Office*